I"III"Il" US010395819B2

(12) United States Patent (10) Patent No.: US 10,395,819 B2
Wukovits et al. (45) Date of Patent: Aug. 27, 2019

(54) MULTIPLE PHASE POWER CONVERTERS HAVING INTEGRATED MAGNETIC CORES FOR TRANSFORMER AND INDUCTOR WINDINGS

(71) Applicant: Astec International Limited, Kowloon (HK)

(72) Inventors: Matthias Wukovits, Vienna (AT); Edin Ramic, Vienna (AT); Klaus Riedmueller, Orth an der Donau (AT); Michele Nobile, Vienna (AT)

(73) Assignee: Astec International Limited, Kwun Tong, Kowloon (HK)

( * ) Notice: Subject to any disclaimer, the term of this patent is extended or adjusted under 35 U.S.C. 154(b) by 117 days.

(21) Appl. No.: 15/251,171

(22) Filed: Aug. 30, 2016

(65) Prior Publication Data
US 2018/0061560 A1 Mar. 1, 2018

(51) Int. Cl.
*H01F 27/24* (2006.01)
*H01F 27/34* (2006.01)
(Continued)

(52) U.S. Cl.
CPC ............ *H01F 27/34* (2013.01); *H01F 27/24* (2013.01); *H01F 30/12* (2013.01); *H02M 1/00* (2013.01); *H02M 3/24* (2013.01); *H02M 3/285* (2013.01); *H01F 27/2876* (2013.01); *H02M 2001/0048* (2013.01); *H02M 2001/0064* (2013.01); *Y02B 70/1491* (2013.01)

(58) Field of Classification Search
CPC ................................................ H01F 27/00–36
USPC .......... 336/65, 83, 170, 173, 180–184, 200, 336/220–223, 212, 234
See application file for complete search history.

(56) References Cited

U.S. PATENT DOCUMENTS 5,177,460 A * 1/1993 Dhyanchand ........... H01F 30/12
336/12
5,355,296 A * 10/1994 Kuo ........................ H02M 7/49
336/182
(Continued)

OTHER PUBLICATIONS

"Introduction to Electrical Engineering", 25 pgs.
(Continued)

*Primary Examiner* — Tuyen T Nguyen
(74) *Attorney, Agent, or Firm* — Harness, Dickey & Pierce, P.L.C.

(57) ABSTRACT

A multiphase DC/DC power converter includes a magnetic core having a plurality of core sections and defining a plurality of magnetic flux paths, and a plurality of winding including a plurality of transformer winding sets and a plurality of inductor windings. Each transformer winding set includes a primary winding and a secondary winding wound about at least one core section of the plurality of core sections. Each inductor winding is wound about another core section of the plurality of core sections. Magnetic flux generated by one transformer winding set of the plurality of transformer winding sets substantially cancels magnetic flux generated by at least one adjacent transformer winding set of the plurality of transformer winding sets. Magnetic flux generated by one inductor winding of the plurality of inductor windings substantially cancels magnetic flux generated by at least one adjacent inductor winding of the plurality of inductor windings.

13 Claims, 11 Drawing Sheets

(51) Int. Cl.
*H01F 30/12* (2006.01)
*H02M 1/00* (2006.01)
*H02M 3/24* (2006.01)
*H02M 3/28* (2006.01)
*H01F 27/28* (2006.01)

(56) References Cited

U.S. PATENT DOCUMENTS

| | | | |
|---|---|---|---|
| 6,939,300 B2* | 9/2005 | Petersen | H04L 5/04 |
| | | | 600/437 |
| 7,142,081 B1* | 11/2006 | Shudarek | H01F 27/24 |
| | | | 336/178 |
| 8,698,584 B2* | 4/2014 | Pietkiewicz | H02M 1/126 |
| | | | 336/12 |
| 2005/0270745 A1* | 12/2005 | Chen | H01F 27/2804 |
| | | | 361/707 |
| 2012/0049993 A1 | 3/2012 | Han et al. | |
| 2013/0201728 A1* | 8/2013 | Njiende | H02M 3/335 |
| | | | 363/21.04 |
| 2016/0020016 A1* | 1/2016 | Ouyang | H02M 1/10 |
| | | | 307/31 |

OTHER PUBLICATIONS

"Single Phase, Three Phase Transformers", <http://www.canadatransformers.com/transformer-phase/>, 2008-2016, 3 pgs.

\* cited by examiner

MULTIPLE PHASE POWER CONVERTERS HAVING INTEGRATED MAGNETIC CORES FOR TRANSFORMER AND INDUCTOR WINDINGS

FIELD

The present disclosure relates to multiple phase power converters having integrated magnetic cores for transformer and inductor windings.

BACKGROUND

This section provides background information related to the present disclosure which is not necessarily prior art.

Power converters can include a single phase (referred to as single phase power converters) or multiple phases (referred to as multiple phases power converters). Sometimes, the single phase power converters can include a core, an inductor winding wound about one section of the core, and transformer windings wound about one section of the core. If the single phase power converters include such a configuration, the thickness of the core (including the core sections for the windings) is increased compared to other cores not including both an inductor winding and transformer windings to ensure mutual induction between the windings does not occur.

SUMMARY

This section provides a general summary of the disclosure, and is not a comprehensive disclosure of its full scope or all of its features.

According to one aspect of the present disclosure, a multiphase DC/DC power converter includes a magnetic core having a plurality of core sections and defining a plurality of magnetic flux paths through the magnetic core, a plurality of winding including a plurality of transformer winding sets and a plurality of inductor windings, and a plurality of power circuits coupled to the plurality of winding. Each transformer winding set includes a primary winding and a secondary winding wound about at least one core section of the plurality of core sections. Each inductor winding is wound about another core section of the plurality of core sections. Each transformer winding set generates magnetic flux in the magnetic core when current is applied to its primary winding and/or secondary winding and each inductor winding generates magnetic flux in the magnetic core when current is applied to the inductor winding. Magnetic flux generated by one transformer winding set of the plurality of transformer winding sets substantially cancels magnetic flux generated by at least one adjacent transformer winding set of the plurality of transformer winding sets. Magnetic flux generated by one inductor winding of the plurality of inductor windings substantially cancels magnetic flux generated by at least one adjacent inductor winding of the plurality of inductor windings.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts, features, etc. throughout the several views of the drawings.

DETAILED DESCRIPTION

Figure 1:
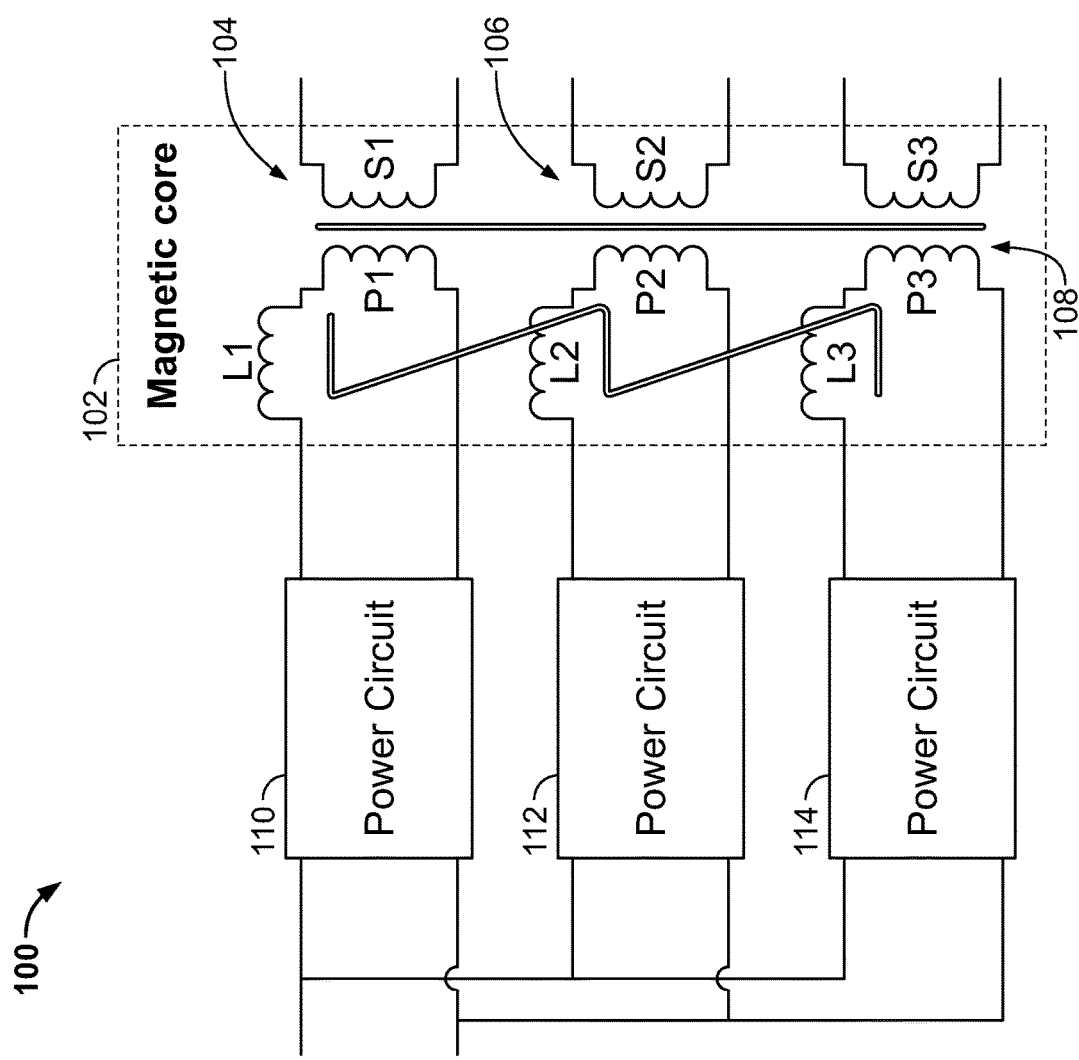
FIG. 1 is a block diagram of a three DC/DC power converter including an integrated magnetic core for transformer windings and inductor windings according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
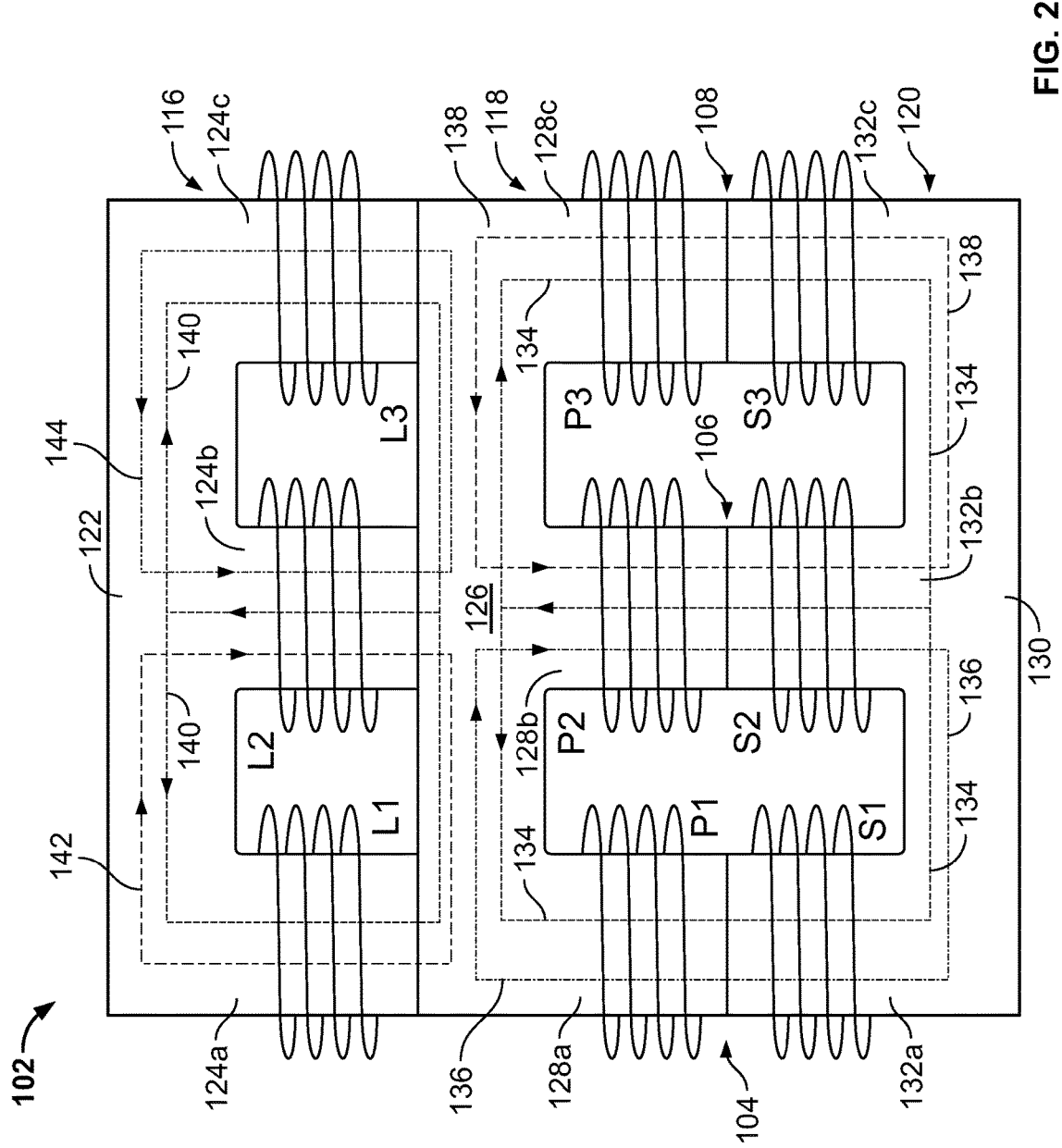
FIG. 2 is a block diagram of the integrated magnetic core, the transformer windings and the inductor windings of FIG. 1, with the windings wound about the magnetic core.

A multiphase DC/DC power converter according to one example embodiment of the present disclosure is illustrated in FIG. 1 and indicated generally by reference number 100. As shown in FIG. 1, the multiphase DC/DC power converter 100 includes a magnetic core 102, windings having transformer winding sets 104, 106, 108 and inductor windings L1, L2, L3, and three power circuits 110, 112, 114 coupled to the windings. As shown in FIG. 2, the magnetic core 102 includes core sections 116, 118, 120, and defines magnetic flux paths through the magnetic core. Each transformer winding set 104, 106, 108 includes a primary winding P1, P2, P3 and a secondary winding S1, S2, S3 wound about at least one core section 118, 120 and each inductor winding L1, L2, L3 is wound about another core section 116. Each transformer winding set 104, 106, 108 generates magnetic flux in the magnetic core 102 when current is applied to its primary winding and/or secondary winding. Similarly, each inductor winding L1, L2, L3 generates magnetic flux in the magnetic core 102 when current is applied to that inductor winding.

As shown in FIG. 2, magnetic flux generated by one transformer winding set substantially cancels magnetic flux generated by at least one adjacent transformer winding set and magnetic flux generated by one inductor winding substantially cancels magnetic flux generated by at least one adjacent inductor winding. For example, magnetic flux generated by one winding, set of windings, etc. may flow through a particular core section in the opposite direction as magnetic flux generated by another winding, another set of windings, etc.

In the particular example of FIG. 2, the magnetic flux (represented by dashed line 134) generated by current flowing in the windings P2, S2 of the transformer winding set 106 substantially cancels the magnetic flux (represented by dashed line 136) generated by current flowing in the windings P1, S1 of the transformer winding set 104 and the magnetic flux (represented by dashed line 138) generated by current flowing in the windings P3, S3 of the transformer winding set 108. Similarly, the magnetic flux (represented by dashed line 140) generated by current flowing in the inductor winding L2 substantially cancels the magnetic flux (represented by dashed line 142) generated by current flowing in the inductor winding L1 and the magnetic flux (represented by dashed line 144) generated by current flowing in the inductor winding L3. As a result, the magnetic flux flowing through the magnetic core 102 can be substantially reduced, and in some cases substantially eliminated. This in turn causes a reduction in core losses due to magnetic flux compared to other known systems.

The core sections 116, 118, 120 of the magnetic core 102 are arranged to form one integrated magnetic core for the inductor windings L1, L2, L3 and the transformer winding sets 104, 106, 108. Therefore, the multiphase power converter 100 may include one integrated magnetic core for its inductor and transformer windings rather than multiple separate cores for transformer windings and/or inductor windings as is conventional. As such, the magnetic core 102 (e.g., portions of the magnetic core 102) and the transformer winding sets 104, 106, 108 form transformers and the magnetic core 102 (e.g., portions of the magnetic core 102) and the inductor windings L1, L2, L3 form inductive elements. The magnetic core 102 and the windings (and/or other cores and windings disclosed herein) together may be referred to a magnetic assembly.

This integrated magnetic core 102 (and other integrated magnetic cores disclosed herein) may have a smaller volume than conventional isolated cores having a similar number of windings as the integrated magnetic core 102. As such, the integrated magnetic cores may be formed of less material which in turn reduces core losses, increases efficiency, reduces costs, etc. compared to conventional isolated cores.

In the particular example of FIGS. 1 and 2, each of the core sections 116, 118, 120 has a base and three legs extending from its base. As such, the core sections 116, 118, 120 may be referred to as "E" shaped core sections. For example, the core section 116 includes a base 122 and three legs 124a, 124b, 124c, the core section 118 includes a base 126 and three legs 128a, 128b, 128c, and the core section 120 includes a base 130 and three legs 132a, 132b, 132c. In other examples, one or more of the core sections 116, 118, 120 may include more or less legs extending from its base as further explained below.

The core sections 116, 118, 120 may be coupled together in various different configurations. For example, and as shown in FIG. 2, the core sections 118, 120 are opposing each other (e.g., their legs facing each other), and the core sections 116, 118 are arranged similar to each other (e.g., their legs facing the same direction). As such, the legs 128a, 128b, 128c of the core section 118 are coupled to the legs 132a, 132b, 132c of the core section 120, and the legs 124a, 124b, 124c of the core section 116 are coupled to the base 126 of the core section 118, as shown in FIG. 2.

As explained above, each transformer winding set 104, 106, 108 includes one primary winding P1, P2, P3 and one secondary winding S1, S2, S3 wound about at least one core section. For example, each transformer winding set 104, 106, 108 may be at least partially wound about three legs of one of the core sections. In some embodiments, each transformer winding set 104, 106, 108 may be wound about legs of more than one core section.

In the particular example of FIG. 2, the primary windings P1, P2, P3 are wound about the legs 128a, 128b, 128c, respectively, of the core section 118, and the secondary windings S1, S2, S3 are wound about the legs 132a, 132b, 132c, respectively, of the core section 120. It should be apparent, however, that the primary windings P1, P2, P3 and/or the secondary windings S1, S2, S3 may be at least partially wound about another core section (e.g., the core section 116, etc.), legs of two core sections (e.g., the core sections 118, 120) in an overlapping configuration (as further explained below), and/or in another suitable configuration.

Similarly, the inductor windings L1, L2, L3 are wound about legs of another one of the core sections. For example, the inductor windings L1, L2, L3 may be wound about legs of the core sections not utilized by the transformer winding sets 104, 106, 108. In the particular example of FIG. 2, the inductor winding L1, L2, L3 are wound about the legs 124a, 124b, 124c, respectively, of the core section 116. It should be apparent, however, the inductor winding L1, L2, L3 may be at least partially wound about another core section (e.g., the core sections 118, 120, etc.) if desired.

As shown in FIG. 1, the multiphase DC/DC power converter 100 includes three phases. Each phase includes one transformer winding set 104, 106, 108, one inductor winding L1, L2, L3, and one power circuit 110, 112, 114 phase shifted relative to each other (e.g., a 120 degree phase shift). For example, and as further explained below, the power circuits 110, 112, 114 (and/or other power circuits disclosed herein) may have primary side voltages phase shifted (e.g., 120 degrees) relative to each other while operating in an interleaved manner.

This phase shifted interleaved configuration may lead to reduced ripple current at the output of the power converter 100 compared to other known systems (e.g., single phase systems). In some instances, the ripple current of the power converter 100 may be reduced by a factor of 10 (e.g., about a 90% change in ripple current) compared to a single phase system. For example, the ripple current of the power converter 100 may be about 0.0419 amps while a ripple current of a single phase power converter may be about 0.483 amps.

Each inductor winding L1, L2, L3 is coupled between a different set of one power circuit 110, 112, 114 and one primary winding P1, P2, P3. For example, the inductor winding L1 is coupled to the primary winding P1 and the power circuit 110, the inductor winding L2 is coupled to the primary winding P2 and the power circuit 112, and the inductor winding L3 is coupled to the primary winding P3 and the power circuit 114. As such, the power circuits 110, 112, 114 of FIG. 1 are coupled to the primary windings P1, P2, P3 via the inductor windings L1, L2, L3, respectively.

As further explained below, the inductor windings L1, L2, L3 of FIG. 1 may represent inductive elements in a resonant converter such as a LLC power converter and/or another suitable power converter. In other examples, the inductor windings L1, L2, L3 may be coupled on the output side of the transformers. For example, the inductor windings L1, L2, L3 may be coupled to the secondary windings S1, S2, S3. In such examples, the output side inductor windings may be employed as filters.

The secondary windings S1, S2, S3 may be coupled to one or more secondary side components, circuits, etc. For example, and as further explained below, the secondary windings S1, S2, S3 may be coupled to one or more rectification circuits.

Figure 3:
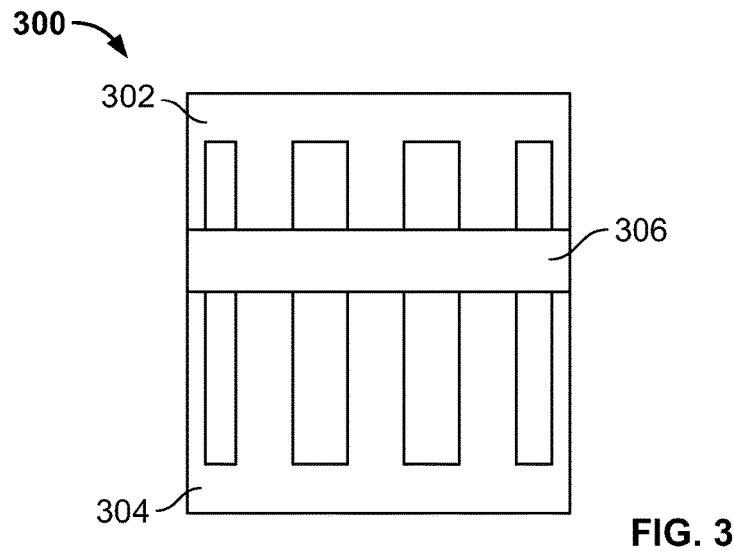
FIG. 3 is a block diagram of an integrated magnetic core for a three phase power converter formed of two modified "E" shaped core sections each having five legs and one "I" shaped core according to yet another example embodiment.

Although the core sections 116, 118, 120 of FIG. 2 are shown as "E" shaped cores, it should be apparent that other suitable shaped cores may be employed without departing from the teachings of the present disclosure. For example, FIG. 3 illustrates a magnetic core 300 that may be employable in the three phase DC/DC power converter 100 of FIG. 1 and/or other power converters disclosed herein. The magnetic core 300 of FIG. 3 is substantially similar to the magnetic core 102 of FIG. 2, but includes two modified "E" shaped core sections 302, 304 and an "I" shaped core section 406 between the two modified "E" shaped core sections 302, 304. The modified "E" shaped core sections 302, 304 of FIG. 3 are substantially similar to the core sections 116, 118, 120 of FIG. 2, but include five legs extending from its base.

The magnetic core 300 of FIG. 3 may function substantially similar to the magnetic core 102 of FIG. 2. For example, transformer winding sets (not shown) may be wound about the inner legs of one modified "E" shaped core section (e.g., core section 304) and inductor windings may be wound about inner legs of the other modified "E" shaped core section (e.g., core section 302), as explained above. Magnetic flux generated by the transformer winding sets and the inductor windings may flow through the inner legs and the outer legs (e.g., sometimes referred to as neutral flux legs) of the core 300 to provide additional flux paths as further explained below.

Figure 4:
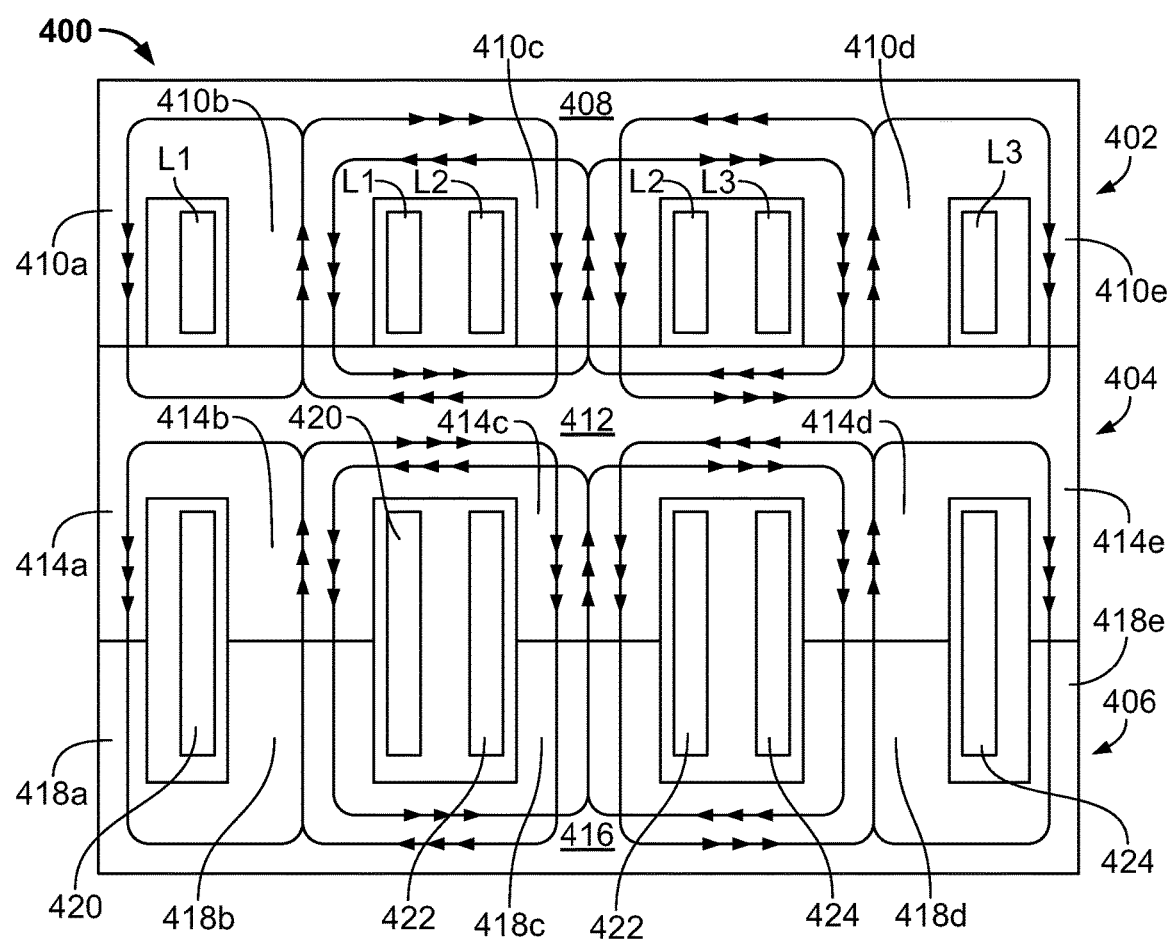
FIG. 4 is a block diagram of a magnetic assembly including an integrated magnetic core for a three phase power converter formed of three modified "E" shaped core sections each having five legs, and transformer windings and inductor windings wound about the magnetic core according to another example embodiment.

FIG. 4 illustrates another magnetic assembly 400 including a magnetic core that may be employable in the three phase DC/DC power converter 100 of FIG. 1 and/or other power converters disclosed herein. The magnetic core of FIG. 4 is substantially similar to the magnetic core 102 of FIG. 2 and the magnetic core 300 of FIG. 3, but including three modified "E" shaped core sections. In particular, the magnetic core includes three core sections 402, 404, 406 each having a base and five legs extending from its base. For example, the core section 402 includes a base 408 and legs 410a-410e extending from the base 408, the core section 404 includes a base 412 and legs 414a-414e extending from the base 412, and the core section 406 includes a base 416 and legs 418a-418e extending from the base 416.

The windings configuration of FIG. 4 is similar to the windings configuration of FIG. 2. For example, inductor windings L1, L2, L3 of FIG. 4 are wound about the inner legs 410b, 410c, 410d of the core section 402, respectively. Similarly, the transformer winding set 420 is wound about the inner legs 414b, 418b of the core sections 404, 406, the transformer winding set 422 is wound about the inner legs 414c, 418c of the core sections 404, 406, and the transformer winding set 424 is wound about the inner legs 414d, 418d of the core sections 404, 406. Although not shown, primary and secondary windings of the transformer winding sets 420, 422, 424 may be wound in different configurations (e.g., overlapping, separated, etc.), as explained above with reference to the transformer winding sets 104, 106, 108 of FIGS. 1 and 2.

Magnetic flux generated by the transformer windings and the inductor windings can flow through the legs of the modified "E" shaped core sections 402, 404, 406, as explained above. This is represented by the arrowed lines shown in FIG. 4. As shown, magnetic flux generated by one transformer winding set (e.g., winding set 422, etc.) substantially cancels magnetic flux generated by another transformer winding set (e.g., winding set 420 and winding set 424), and vice versa. Magnetic flux generated by the inductor windings L1, L2, L3 is substantially cancelled in a similar manner. As a result, the magnetic flux flowing through the magnetic core can be substantially reduced, and in some cases substantially eliminated.

Magnetic flux not fully cancelled (e.g., generated by the winding set 420, 424, etc. and/or the inductor windings L1, L3, etc.) may flow through neutral flux legs of the core 400. For example, and as shown in FIG. 4, the outer legs 410a, 410e, 414a, 414e, 418a, 418e of the core sections 402, 404, 406 may provide additional paths for magnetic flux generated by the transformer winding sets 420, 424 and the inductor windings L1, L3. These additional outer legs (e.g., the neutral flux legs) allow neutral magnetic flux generated by neutral current flowing in the windings to cancel (e.g. become substantially zero) in a balanced three phase system (e.g., a 120 degree phase shifted three phase power converter) employing the magnetic core of FIG. 4.

In some examples, the magnetic cores of FIGS. 3 and 4 and/or other magnetic cores disclosed herein may be formed of iron and/or another suitable material. For example, if the magnetic cores of FIGS. 3 and 4 are formed of iron, the neutral flux legs of FIGS. 3 and 4 may have an iron core cross section ($A_{FE}$) of about one third of the iron core cross section ($A_{FE}$) of the inner legs. Alternatively, the iron core cross section ($A_{FE}$) of the neutral flux legs may be larger or smaller depending on, for example, particular design requirements, etc.

Figure 5:
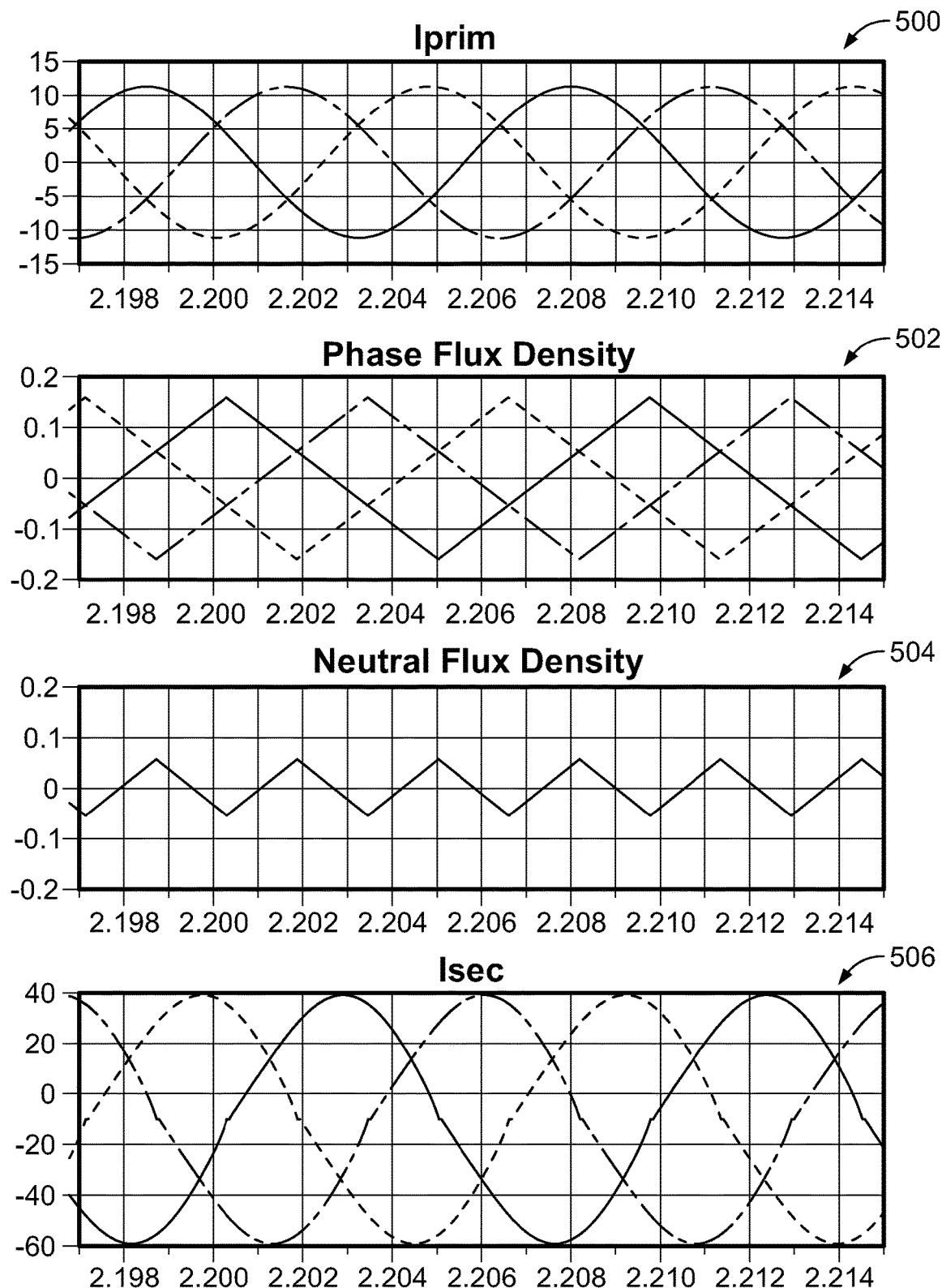
FIG. 5 is a graph representing current flowing through the transformer windings wound about the magnetic core of FIG. 4 and magnetic flux in the magnetic core of FIG. 4.

For example, FIG. 5 illustrates waveforms 500, 502, 504, 506 of current, magnetic flux for each phase, and a neutral flux in a three phase power converter including the magnetic core of FIG. 4. In particular, the waveforms 500, 502, 504, 506 represent primary winding current for each phase, absolute magnetic flux for each phase, an absolute magnetic flux for the neutral (e.g., following in neutral flux legs), and secondary winding current for each phase, respectively. As shown, the primary winding currents and the secondary winding currents are balanced sine waveforms and the magnetic fluxes are balanced triangular waveforms. This balanced configuration may be due to, for example, the neutral flux legs of the magnetic core of FIG. 4, primary side voltages having a phase shift (e.g., a 120 degree phase shift) relative to each other, etc.

Figure 6:
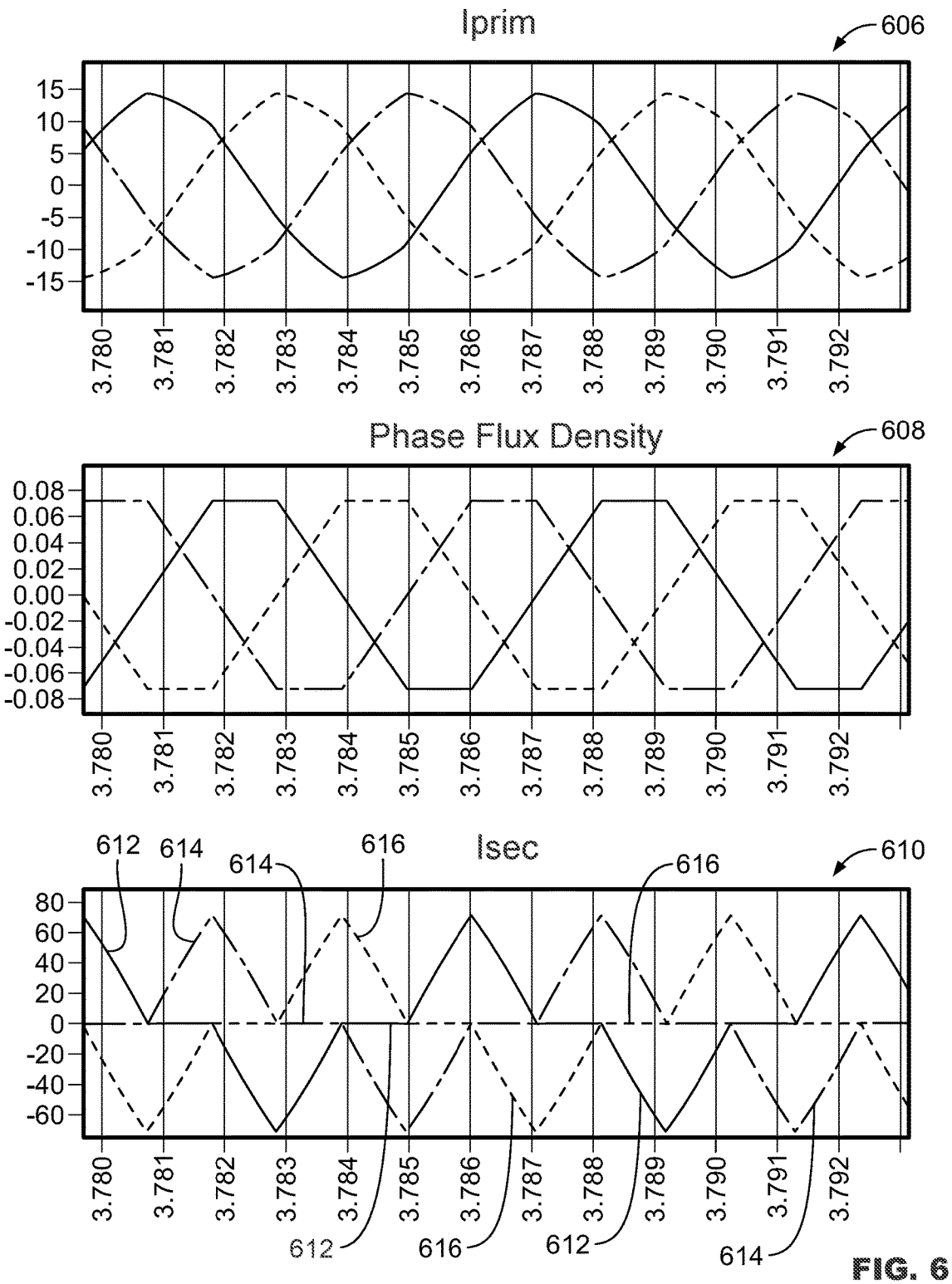
FIG. 6 is a graph representing current flowing through transformer windings wound about a magnetic core formed of "E" shaped core sections having three legs and magnetic flux in the magnetic core according to another example embodiment.

In some examples where neutral flux legs are not employed, neutral magnetic flux generated by neutral current flowing in windings may not cancel. For example, FIG. 6 illustrates waveforms 606, 608, 610 of current and magnetic flux for each phase in a three phase power converter including a magnetic core not having neutral flux legs (e.g., the magnetic core 200 of FIG. 2). In particular, the waveforms 606, 608, 610 represent primary winding current for each phase, magnetic flux for each phase, and secondary winding current for each phase, respectively. As shown, the magnetic flux from each phase forms triangular waveforms. The sum of these triangular waveforms equals about one third of the amplitude of the triangular waveforms. As a result, the secondary winding currents create triangular waveforms (represented by lines 612, 614, 616) which may cause RMS current losses to increase to undesirable levels.

The example integrated magnetic cores disclosed herein can be designed to reduce core losses, optimize magnetic flux distribution, optimize magnetic path lengths, etc. For example, any one of the integrated magnetic cores may be designed to have a particular geometric shape, particular leg lengths, one or more air gaps (e.g., a particular sized air gap between center leg(s) of the core, etc.), etc. This may increase power converter efficiency and/or power density relative to other systems not including the integrated magnetic cores. For example, FIG. 7 illustrates a magnetic assembly 700 including a magnetic core 702 designed to optimize core losses, magnetic flux distribution, magnetic path lengths, etc. and remain functionally equivalent to the magnetic assembly 400 of FIG. 4.

Figure 7:
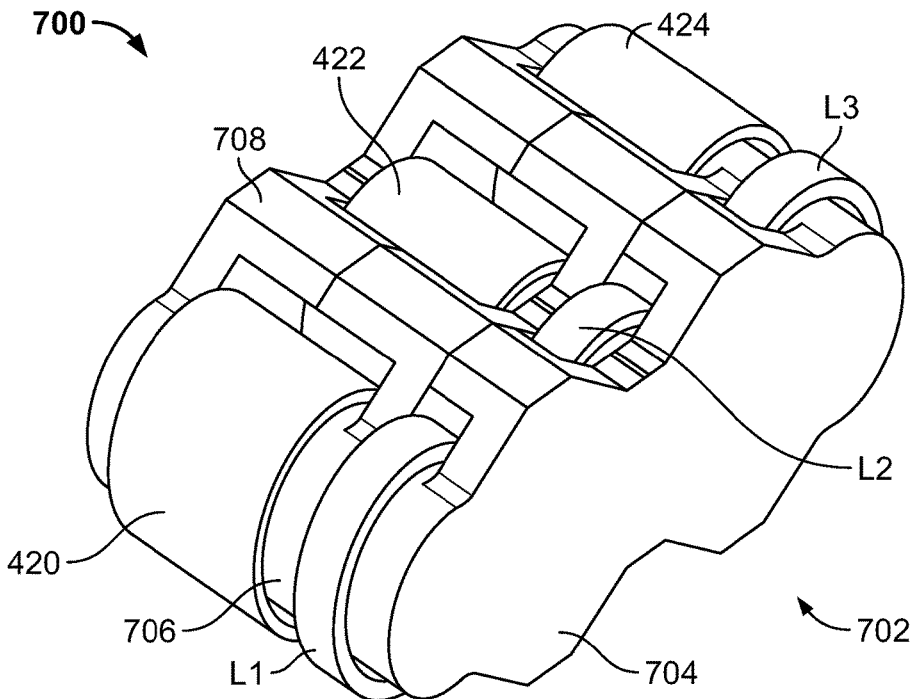
FIG. 7 is an isometric view of a magnetic assembly including a magnetic core having circular cross sectional shaped inner core legs, and transformer windings and inductor windings wound about the inner core legs according to yet another example embodiment.

As shown in FIG. 7, the magnetic core 702 includes three modified "E" shaped core sections 704, 706, 708 each having a base and seven legs extending from its base. The core sections 704, 706, 708 of FIG. 7 are coupled together in a similar manner as the core sections 116, 118, 120 of FIG. 2.

In the particular example of FIG. 7, each core section 704, 706, 708 includes three inner legs configured to receive windings and the four outer legs (of which two are shown) for providing a neutral flux path as explained above. As shown, the inductor windings L1, L2, L3 of FIG. 4 are wound about the three inner legs of the core section 704 and the transformer winding sets 420, 422, 424 of FIG. 4 are wound about three inner legs of the core sections 706, 708, as explained above. In other embodiments, more or less outer and/or inner legs, more or less windings, etc. may be employed as desired.

The legs of the core sections may be shaped as desired to achieve desirable results as explained above. In the particular example of FIG. 7, the inner legs of each core section 704, 706, 708 have a substantially circular cross sectional shape and the outer legs of each core section 704, 706, 708 have a substantially triangular cross sectional shape.

Figure 8:
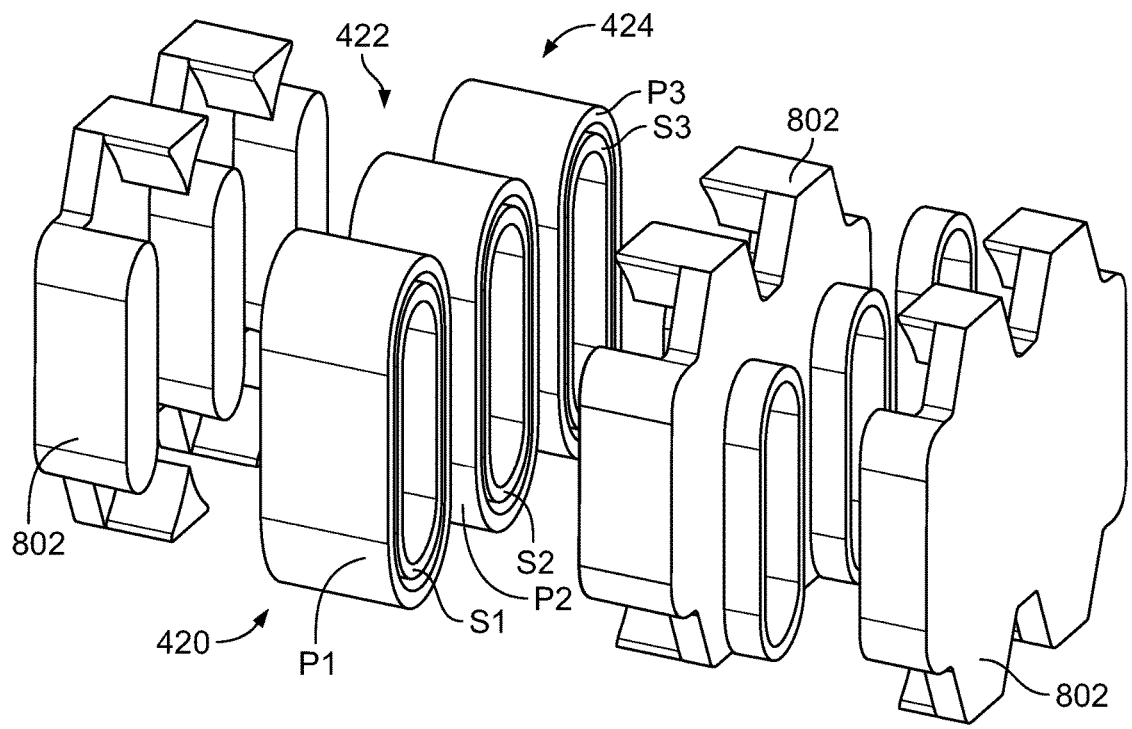
FIG. 8 is an exploded isometric view of a magnetic assembly including a magnetic core having elliptical cross sectional shaped inner core legs, and transformer windings and inductor windings wound about the inner core legs according to another example embodiment.

In other embodiments, the inner legs and/or the outer legs of each core section may have a different shape. For example, FIG. 8 illustrates a magnetic assembly 800 including a magnetic core 802 that is functionally equivalent to the magnetic assembly 400 of FIG. 4. The magnetic core 802 is substantially similar to the magnetic core 702 of FIG. 7, but the inner legs of each core section of the magnetic core 802 have a substantially elliptical cross sectional shape.

Additionally, and as shown in FIG. 8, the transformer winding sets 420, 422, 424 of FIG. 4 include primary windings P1, P2, P3 and secondary windings S1, S2, S3 of three transformer winding sets are wound in an overlapping configuration. For example, the secondary windings S1, S2, S3 are positioned adjacent inner legs of two core sections and the primary windings P1, P2, P3 overlap the secondary windings S1, S2, S3. In other embodiments, the windings may be wound in another suitable configuration as explained above.

The multiphase power converters disclosed herein may include any suitable topology. For example, the power converters may include resonant converter topologies such as half bridge series resonant converters, full bridge parallel resonant converters, half bridge LLC resonant converters, full bridge LLC resonant converters, etc. In such examples, the inductor windings and/or the transformer windings disclosed herein may be employed as resonant elements. Capacitors and/or other inductive elements besides the inductor windings and/or the transformer windings may be added for additional and/or alternate resonant elements if desired.

Figure 9:
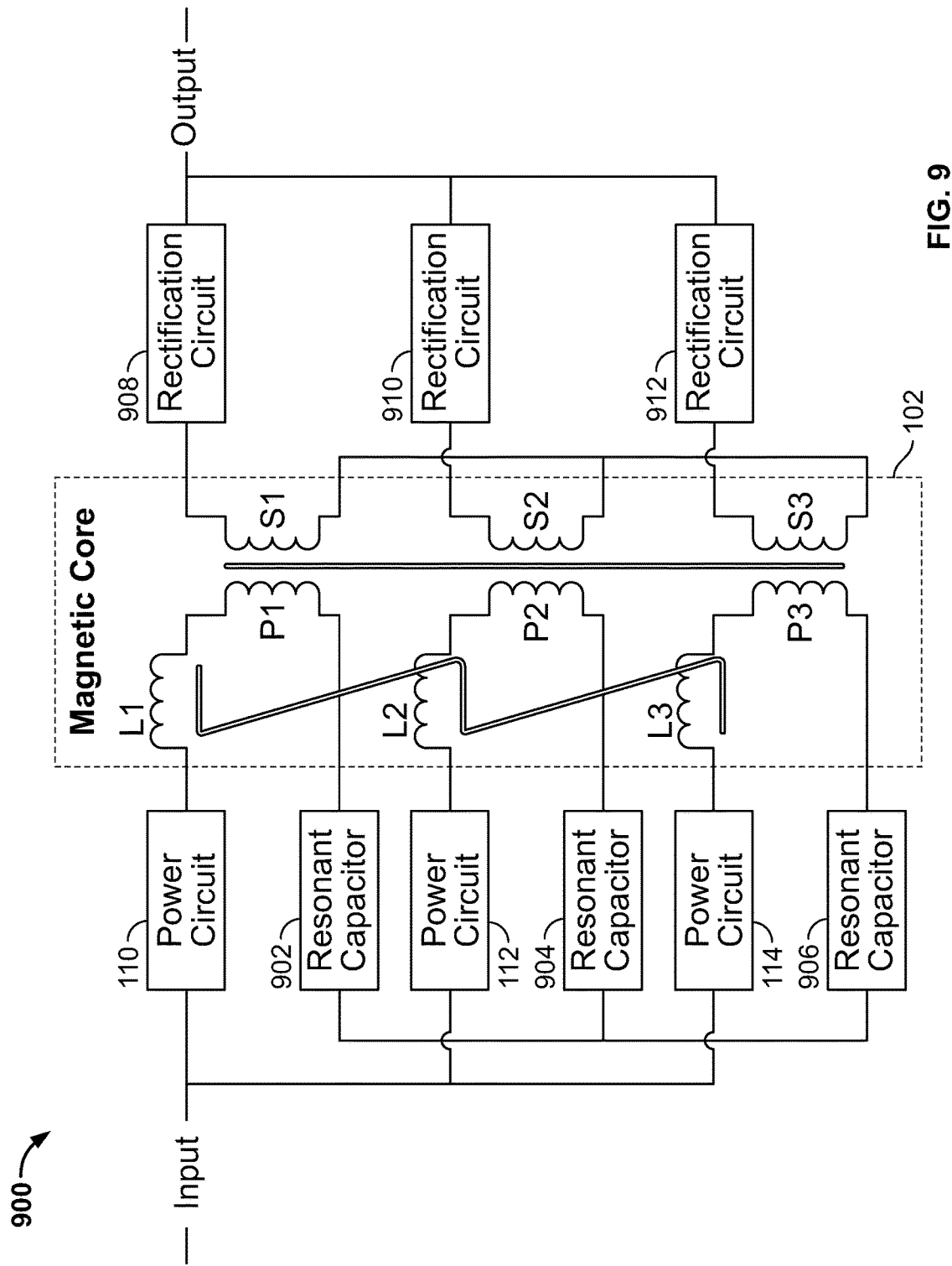
FIG. 9 is a block diagram of a three phase LLC resonant power converter including three rectification circuits and an integrated magnetic core for transformer windings and inductor windings according to another example embodiment.

For example, FIG. 9 illustrates a three phase DC/DC power converter 900 including a LLC resonant converter topology. The power converter of FIG. 9 is substantially similar to the power converter 100 of FIG. 1, but includes resonant capacitors 902, 904, 906. In particular, and as shown in FIG. 9, the power converter 900 includes the power circuits 110, 112, 114, the integrated magnetic core 102, the primary transformer windings P1, P2, P3, the inductor windings L1, L2, L3, and the secondary transformer windings S1, S2, S3 of FIG. 1, and the resonant capacitors 902, 904, 906 coupled to the primary windings P1, P2, P3.

In the particular example of FIG. 9, the primary transformer windings P1, P2, P3 (and/or other primary windings disclosed herein) can be coupled in a star configuration together with the inductor windings L1, L2, L3 and the resonant capacitors 902, 904, 906 to form the LLC resonant network. As such, the phase currents are inherently balanced due to the star configuration. These balanced phase currents allows for accurate phase shifts without, for example, appropriately matched passive components (e.g., the resonant capacitors 902, 904, 906, the inductor windings L1, L2, L3, etc.) and for soft switching in power switches (not shown) in the power circuits 110, 112, 114. Alternatively, the primary transformer windings P1, P2, P3 and the inductor windings L1, L2, L3 may be coupled in another suitable configuration such as a delta, etc.

In some embodiments, the power converters disclosed herein may include one or more rectification circuits and/or output filters including passive element(s) (e.g., capacitors, inductors, etc.) coupled to the transformer windings. For example, the power converter 900 of FIG. 9 includes rectification circuits 908, 910, 912 coupled to the secondary transformer windings S1, S2, S3, respectively. The rectification circuits 908, 910, 912 may include, for example, active and/or passive switching devices such as diodes, power switches (e.g., semiconductors, etc.), etc. In some examples, the rectification circuits 908, 910, 912 can be physically attached to the magnetic core 102. This may shorten the current path between the secondary transformer windings S1, S2, S3 and the rectification circuits 908, 910, 912, optimize power density of the power converter 900, assist in thermal management, optimize the manufacturing process, etc.

Figure 10A:
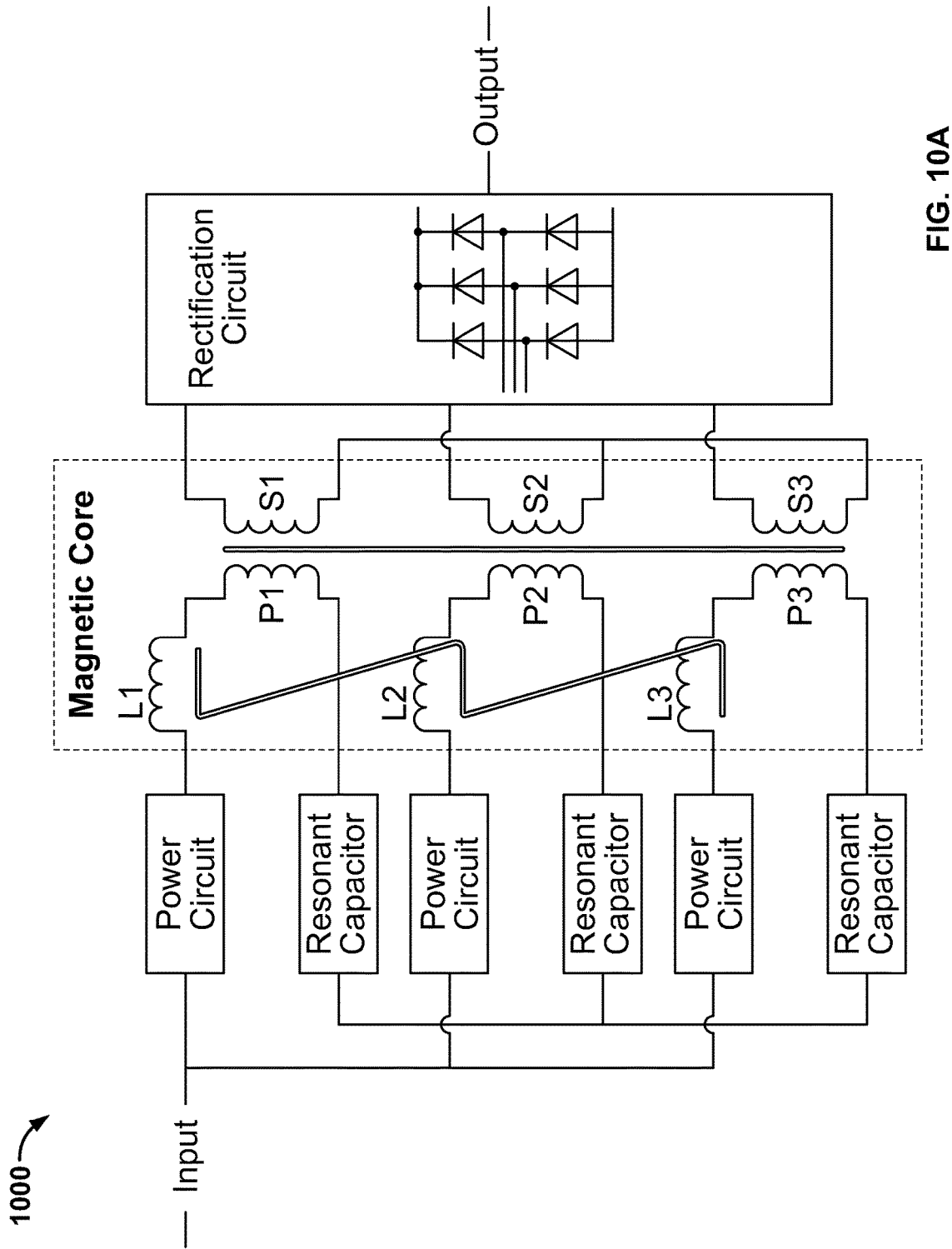
FIG. 10A is a block diagram of a three phase LLC resonant power converter including an integrated magnetic core for transformer secondary windings coupled in a star configuration according to yet another example embodiment.
Figure 10B:
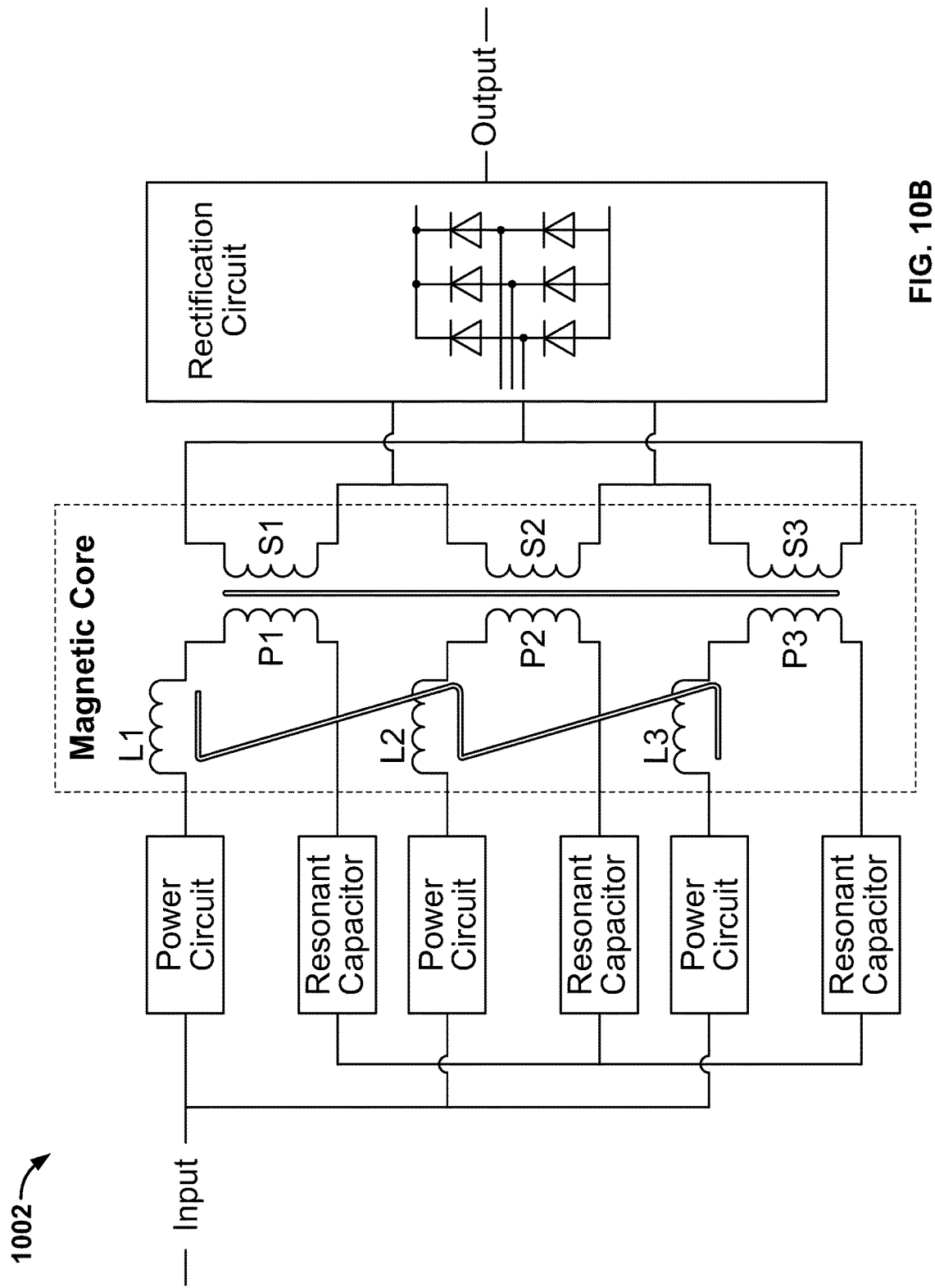
FIG. 10B is a block diagram of a three phase LLC resonant power converter including an integrated magnetic core for transformer secondary windings coupled in a delta configuration according to another example embodiment.
Figure 10C:
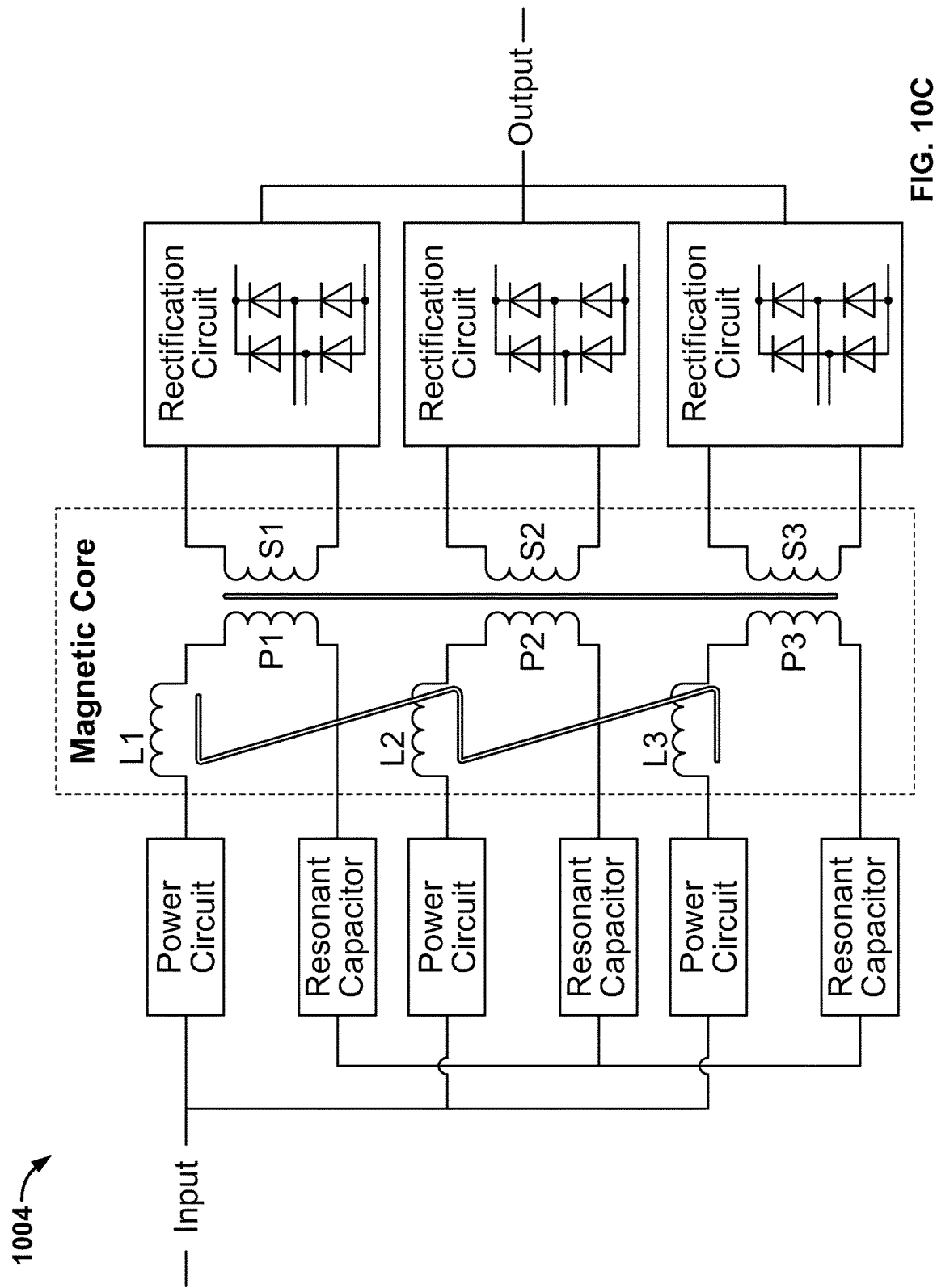
FIG. 10C is a block diagram of a three phase LLC resonant power converter including an integrated magnetic core for transformer secondary windings coupled in a parallel configuration according to yet another example embodiment.

Similar to the primary transformer windings P1, P2, P3, the secondary transformer windings S1, S2, S3 (and/or other secondary windings disclosed herein) can be coupled together in any suitable configuration. For example, the secondary transformer windings S1, S2, S3 of FIG. 9 are coupled in a star configuration to the individual rectification circuits 908, 910, 912, and the outputs of the rectification circuits 908, 910, 912 are coupled in parallel. In other embodiments, the secondary transformer windings S1, S2, S3 may be coupled in a star configuration to one rectification circuit as shown by the power converter 1000 of FIG. 10A, in a delta configuration to one rectification circuit as shown by the power converter 1002 of FIG. 10B, in a parallel configuration to individual rectification circuits as shown by the power converter 1004 of FIG. 10C, etc. Any one of the configurations may allow for soft switching in power switches (not shown) on the secondary side of the power converter.

In some examples, the inductor windings disclosed herein and the primary windings disclosed herein may be separate magnetic conductors coupled together within the magnetic assembly as explained herein. In other examples, a single magnetic conductor can be used for one inductor winding and one primary winding. This may, for example, assist in reducing cable and/or circuit board connections between the transformer and inductor windings thereby providing an increased power density design. For example, the single magnetic conductors and/or separate magnetic conductors may be Litz wires (e.g., triple insulated Litz wires, etc.), copper foils, plate conductors, and/or any other suitable standard magnetic conductors. In some embodiments, a coil former can be used to align windings. This coil former can be an external fixture that is removed after the winding process, can be part of the magnetic assembly, etc.

Figure 11:
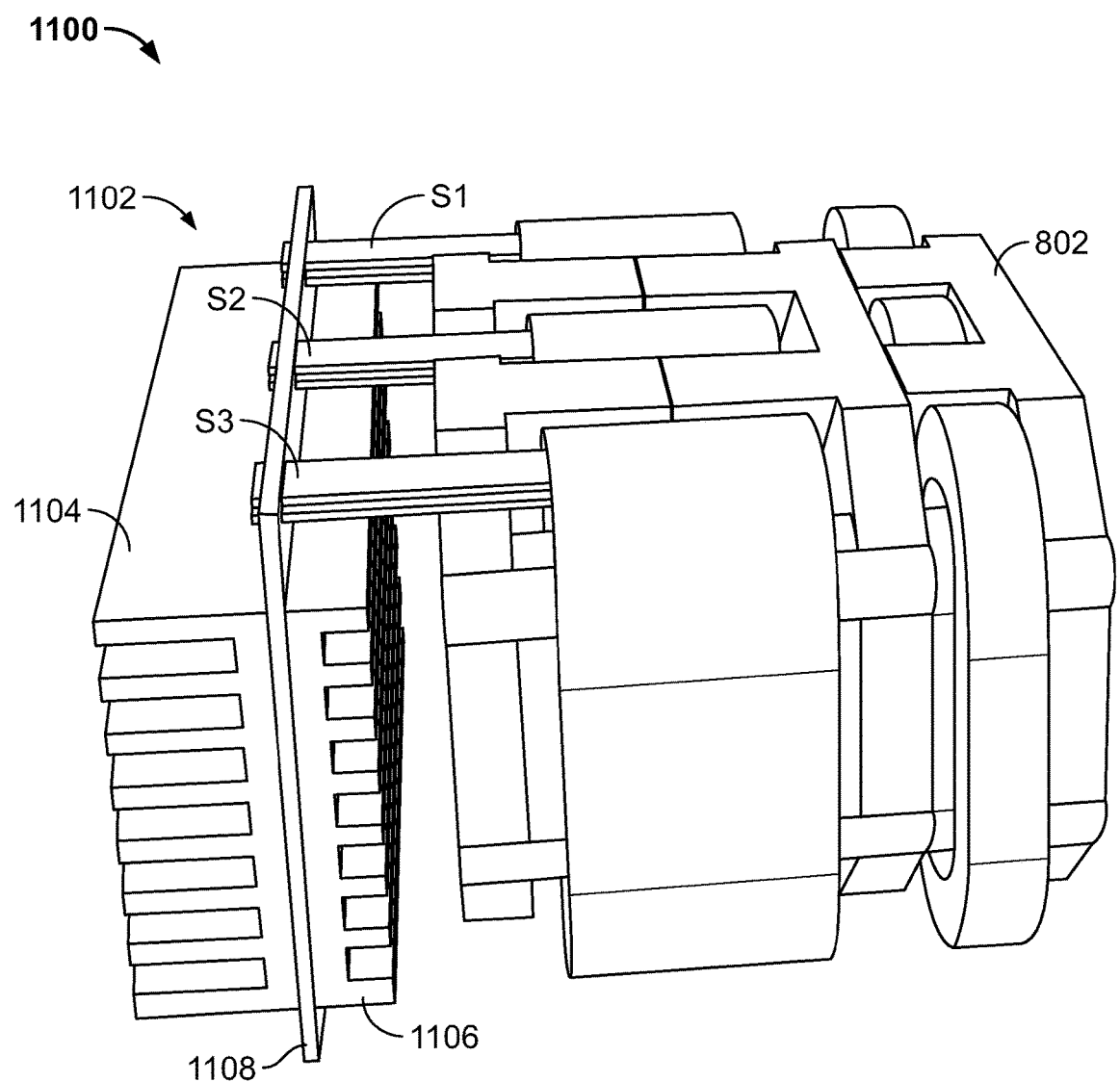
FIG. 11 is an isometric view of the magnetic assembly of FIG. 8 including a heat sink assembly coupled to the transformer windings according to yet another example embodiment.

In some embodiments, one or more heat dissipating components may be coupled to one or more of the magnetic assemblies disclosed herein to assist in thermal management. For example, FIG. 11 illustrates a magnetic assembly 1100 including the magnetic core 802 and windings of FIG. 8, and a heat sink assembly 1102 coupled to at least one of the windings. In the particular example of FIG. 11, the heat sink assembly 1102 is coupled to the secondary transformer windings S1, S2, S3 extending from the magnetic core 802.

As shown in FIG. 11, the heat sink assembly 1102 includes two sets of fins 1104, 1106 positioned on opposing sides of a circuit board 1108 (e.g., a printed circuit board, etc.) for dissipating heat from the magnetic assembly 1100. If desired, the circuit board 1108 may be used to support one or more rectification circuits (e.g., any one or more of the rectification circuits of FIGS. 9, 10A, 10B, 10C, etc.) and/or other suitable secondary side circuits.

The magnetic assemblies disclosed herein may be designed to optimize power density and/or efficiency at different power levels (e.g., 3 kW, 4 kW, 6 kW, 8 kW, etc.). As such, features of the magnetic assemblies can be optimized to achieve high power density and/or high efficiency at a particular power level (e.g., 3.5 kW). For example, the magnetic assembly 800 of FIG. 8 can be optimized to maximize power density in the LLC resonant power converter 900 of FIG. 9. Alternatively, the magnetic assembly 800 of FIG. 8 can be optimized to maximize efficiency for the LLC resonant power converter 900 of FIG. 9.

Thus, if the magnetic assembly 800 is optimized to maximize power density, the percent change in a footprint (e.g., about 1680 mm$^2$) of such a design can be about 33% less than a footprint (e.g., about 2500 mm$^2$) of the magnetic assembly 800 optimized to maximize efficiency. If, however, the magnetic assembly 800 is optimized to maximize efficiency, the percent change in the power loss (e.g., about 6 W) in the core of such a design can be about 40% less than the power loss (e.g., about 10 W) of the magnetic assembly 800 optimized to maximize power density.

Additionally, the magnetic assemblies disclosed herein (e.g., the magnetic cores, windings, etc.) can be used in various different power supplies including AC-DC switched mode power supplies and/or DC-DC switched mode power supplies. In some embodiments, the power supplies can have about 1.6 inch (e.g., a rack unit of 1 U) height.

In some examples, a power supply may include multiple power converters (e.g., a multiphase power supply) each including one of the magnetic assemblies disclosed herein. Each of the power converters may be, for example, a three phase LLC resonant converter (e.g., the power converter 900, etc.). In such examples, each three phase LLC resonant converter may be operated such that each phase has a 60 degree phase shift relative to the other two phases. This configuration may achieve a lower output ripple current compared to other systems including one three phase power converter, a single phase power converter, etc.

By employing one or more of the magnetic assemblies disclosed herein, the space required by the magnetic assemblies on, for example, a circuit board may be reduced compared to known systems thereby increasing power density as explained above. Additionally, and as explained above, magnetic paths in the integrated magnetic cores of the magnetic assemblies may be used in conjunction by different windings to efficiently utilize core material and reduce overall material volume which may reduce core losses. Further, phase shifted currents in the primary windings may allow flux cancellation which will reduce core losses.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A multiphase DC/DC power converter comprising:
   a magnetic core including a plurality of core sections and defining a plurality of magnetic flux paths through the magnetic core,
   a plurality of winding including a plurality of transformer winding sets and a plurality of inductor windings,
   each transformer winding set including a primary winding and a secondary winding wound about at least one core section of the plurality of core sections, said each transformer winding set generating magnetic flux in the magnetic core when current is applied to its primary winding and/or secondary winding, magnetic flux generated by one transformer winding set of the plurality of transformer winding sets canceling magnetic flux generated by at least one adjacent transformer winding set of the plurality of transformer winding sets,
   each inductor winding wound about another core section of the plurality of core sections, said each inductor winding generating magnetic flux in the magnetic core when current is applied to said each inductor winding, magnetic flux generated by one inductor winding of the plurality of inductor windings canceling magnetic flux generated by at least one adjacent inductor winding of the plurality of inductor windings, and
   a plurality of power circuits coupled to the plurality of winding.

2. The multiphase DC/DC power converter of claim 1 wherein at least one of the plurality of core sections includes a base and at least three legs extending from the base.

3. The multiphase DC/DC power converter of claim 1 wherein the at least three legs includes five or more legs extending from the base.

4. The multiphase DC/DC power converter of claim 1 wherein the plurality of core sections include at least a first core section, a second core section, and a third core section each having a base and at least three legs extending from the base, wherein the plurality of transformer winding sets includes three transformer winding sets at least partially wound about three legs of the first core section, and wherein the plurality of inductor windings includes three inductor windings wound about three legs of the second core section.

5. The multiphase DC/DC power converter of claim 4 wherein the at least three legs of the first core section is coupled to the at least three legs of the third core section.

6. The multiphase DC/DC power converter of claim 5 wherein the three transformer winding sets are wound about the at least three legs of the first core section and the at least three legs of the third core section.

7. The multiphase DC/DC power converter of claim 1 wherein at least one of the plurality of core sections includes a substantially circular cross sectional shape.

8. The multiphase DC/DC power converter of claim 1 wherein at least one of the plurality of core sections includes a substantially elliptical cross sectional shape.

9. The multiphase DC/DC power converter of claim 1 wherein said each inductor winding is coupled to a different primary winding of said each transformer winding set.

10. The multiphase DC/DC power converter of claim 1 wherein the multiphase DC/DC power converter includes a resonant converter.

11. The multiphase DC/DC power converter of claim 1 further comprising at least one rectification circuit coupled to the plurality windings.

12. The multiphase DC/DC power converter of claim 1 wherein the plurality of power circuits are phase shifted relative to each other.

13. The multiphase DC/DC power converter of claim 1 further comprising a heat dissipating component coupled to at least one of the plurality of winding.

* * * * *